Figure 1:
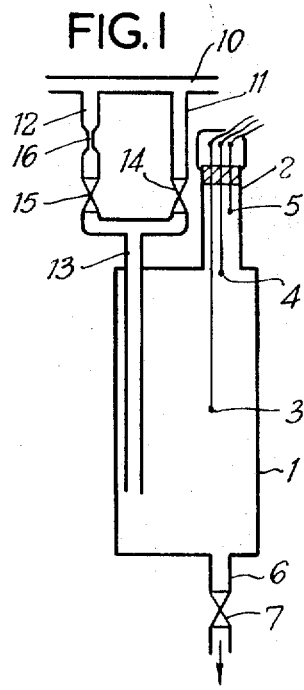

United States Patent

[11] 3,599,666

| [72] | Inventors | Peter Edward Curtis;<br>Peter Alfred Robert Wills, both of Ilford, England |
|---|---|---|
| [21] | Appl. No. | 26,505 |
| [22] | Filed | Apr. 8, 1970 |
| [45] | Patented | Aug. 17, 1971 |
| [73] | Assignee | Ilford Limited<br>Ilford, England |
| [32] | Priority | Apr. 8, 1969 |
| [33] | | Great Britain |
| [31] | | 17827/69 |

[54] MEASURING DEVICE
9 Claims, 3 Drawing Figs.

[52] U.S. Cl. .................................................. 137/391,
141/128, 222/20
[51] Int. Cl. ...................................................... G05d 9/12
[50] Field of Search ............................................ 137/386,
391, 392; 141/128; 222/64, 76, 444, 450

[56] References Cited
UNITED STATES PATENTS

| 2,948,307 | 8/1960 | Rittenhouse et al. | 141/128 X |
| 3,053,414 | 9/1962 | Rapisarda | 222/20 |
| 3,091,252 | 5/1963 | Jones | 137/392 |
| 3,469,596 | 9/1969 | Branton | 137/392 X |

*Primary Examiner*—M. Cary Nelson
*Assistant Examiner*—David R. Matthews
*Attorney*—Cushman, Darby and Cushman ABSTRACT: This application describes a liquid metering vessel which comprises two upper liquid contact probes the lower of which controls a fast-filling valve and the upper of which controls a slow-filling valve. The vessel is filled with liquid through the fast-filling valve until the lower contact probe is reached. The fast-filling valve is then shut off and liquid enters the vessel through the slow-filling valve until the upper probe is reached. The upper probe is placed in an extension to the vessel which has a considerably smaller diameter than the rest of the vessel. The fast-filling valve is then shut off. By means of this vessel the amount of liquid fed into the vessel may be very strictly controlled.

Similar probes may be fitted in the lower part of the vessel to control the rate of outflow from the vessel.

PATENTED AUG 17 1971 3,599,666

INVENTORS:
PETER EDWARD CURTIS
PETER ALFRED ROBERT WILLS

BY: Cushman, Darby & Cushman
ATTORNEYS

MEASURING DEVICE

This invention relates to a metering apparatus for liquid and in particular to a device which can be used in a batch metering system.

According to the present invention there is provided an apparatus for metering liquid into a vessel to establish a predetermined level of liquid in the vessel, which comprises a main vessel having an extension at the upper end thereof which is of substantially smaller cross section than the main body of the vessel and within which extension the said predetermined level is set, a first device sensitive to the level of liquid in the main body of the vessel and adapted to operate when the said level reaches a position near to the top of the main body of the vessel, a second device sensitive to the level of liquid in the said extension and adapted to operate when the level in said extension reaches the said predetermined level, means for charging liquid to the vessel including a feed line operating at a faster rate and a feed line operating at a slower rate, and means for stopping the flow of liquid through the faster line by operation of the said first device, and means for stopping the flow of liquid through the slower line by the operation of said second device.

The liquid charged into the vessel may be discharged therefrom via a discharge pipe located at the base of the container, means being provided for stopping the discharge of liquid from the discharge pipe.

Preferably the discharge of liquid from the vessel is stopped by operation of a third device sensitive to the level of liquid in the main body of the vessel and adapted to operate when the said level falls to a level below the level of liquid at which the first said device operates. Preferably the level at which the said third device operates is near to the bottom of the vessel.

Preferably the means in each case for stopping the flow of liquid through the said faster filling line and the said slower filling line and for stopping the discharge of liquid from the vessel is an in-line valve.

Preferably the means for charging liquid to the vessel is a liquid supply manifold connected to a liquid storage vessel. The manifold has two branches therefrom which constitute the two feed lines, one being the said faster feed line and the other being the said slower feed line. The flow of liquid through the slower feed line may be controlled by the dimensions of an in-line valve, by the dimensions of the pipe which constitutes the feed line or by the presence of a positive restriction in the feed line.

Advantageously the fast feed line and the slow feed line are joined to form a common liquid inlet pipe to the vessel and most preferably the outlet of this said inlet pipe is below the normal level of the liquid in the vessel.

The type of device, which is sensitive to the level of liquid in the vessel, employed in the apparatus of the present invention depends on the liquid which is to be metered. If the liquid is an electroconductive liquid, for example an aqueous salt solution, then the device may comprise electrical contact probes, the liquid completing an electrical circuit when it reaches the level of the contact probe, or in the case of the lowest contact probe breaking an electrical circuit when the level of the liquid falls below the contact probe.

Advantageously the apparatus of the present invention may be used as a metering device for liquids, a predetermined volume of liquid being discharged from the vessel during each operation of the apparatus.

According to a preferred embodiment of the present invention, therefore, there is provided a metering device for electroconductive liquids which comprises a liquid containing vessel which has at its top end an extension integral with the container but having a substantially smaller cross section than the main body of the vessel, there being present in the body of the vessel a lower electrical contact probe and a middle electrical contact probe and present in the extension to the liquid vessel an upper electrical contact probe, also there being present in the vessel a liquid inlet pipe, the said liquid inlet pipe being connected by two branches to a liquid supply manifold, one branch being a faster filling branch having an in-line valve, the closing of which is controlled by the said middle probe, the other branch being a slower filling branch having an in-line valve, the closing of which is controlled by the said upper probe and there being an outlet pipe from the liquid vessel which comprises an in-line valve, the closing of which is controlled by the said lower probe and there being attached to the device means for controlling the opening of each of the three valves.

It is preferred that the liquid inlet level of the inlet pipe in the liquid vessel is below the level of the lower probe in order to minimize liquid surges when the vessel is being filled.

Preferably the cross section of the extension to the vessel is not more than about one-tenth of the cross section of the container. The flow of liquid through the slower-filling branch may be restricted by the dimensions of the valve or of the pipes leading to the valve or by the presence of a positive restriction in the pipes leading to the valve.

The levels of the probes in the liquid container can be set so that the exact volume of liquid required is delivered from the container when the level of liquid falls from just covering the end of the upper probe to just below the bottom probe. Preferably the levels of the probes are preset so that the device meters a fixed volume of liquid during each operation.

Normally the container contains liquid to just below the level of the lower probe, i.e. so that circuit is not completed. In operation the valve in the faster filling branch is caused to open and liquid from the liquid supply manifold enters the vessel filling it until the level reaches the middle probe which is preferably sited just below the level to the extension of the vessel. The valve in the faster filling branch is then shut, this being actuated by a circuit being completed when the electroconductive liquid just reaches the middle probe. Preferably this completion of the circuit also actuates the opening of the valve in the slower filling branch. Liquid then slowly enters the vessel and fills the extension to the vessel, until the upper probe is reached. The valve in the slower-filling branch is then shut, this being actuated by a circuit being completed when the electroconductive liquid just reaches the upper probe. The vessel is then full of the electroconductive liquid and it is emptied by causing the valve in the outlet pipe to open. The liquid level in the vessel then falls until the lower probe is just uncovered. This breaks a circuit and causes the valve in the liquid outlet pipe to close. To ensure greater accuracy a restriction may be provided in the outlet pipe.

However when the liquid to be metered is not electroconductive electrical contact probes may still be employed if an electrically conducting material is floated on the liquid, e.g. an aluminum float connected so as to complete a circuit when it touches a contact probe.

When a corrosive liquid is so metered it is preferred that probes should not come into contact with such a liquid. A suitable device which is sensitive to the level of liquid for use in such a case, to be used in conjunction with a light transparent vessel, is a light source placed on one side of the vessel and a photocell on the other side. When the level of the liquid rises sufficiently to prevent sufficient light reaching the photocell on the opposite side of the vessel the device is then operated. On the other hand when a third such device is present in the apparatus, when the level of the liquid drops sufficiently to enable sufficient light from a source on one side of the vessel to reach a photocell on the other side then the device is operated.

In such cases when the liquid is corrosive and a light opaque vessel, such as a metal vessel, has to be employed a radioactive source may be floated on the liquid. The position of the radioactive source in the vessel provides an indication of the level of the liquid in the vessel and its position may be determined by a Geiger counter outside the vessel. Therefore, in this embodiment of the invention, two Geiger counters are provided on the outside of the vessel, and a radioactive source is present on a float on the top of the liquid. One Geiger counter being so positioned that it can detect the level of the liquid when it is near the top of the main body of the vessel, the second Geiger counter being so positioned that it can detect the level of the liquid in the extension to the vessel. Means being actuated by the first Geiger counter for stopping the flow of liquid through the faster line when it indicates that the level of liquid in the main vessel is near the top of the vessel and means being actuated by the second Geiger counter when it indicates that the level of the liquid in the extension has reached the said predetermined level. In the preferred embodiment of this aspect of the invention there is also provided a Geiger counter so positioned that it can detect the desired lowest level of the liquid in the vessel. When the liquid falls to this level means which are actuated by this Geiger counter cause a valve in the liquid outlet line to close.

It is to be understood that the three types of device sensitive to the level of liquid hereinbefore described are merely exemplary of the types of device which may be used to detect the level of liquid in the vessel and that other devices sensitive to the level of liquid in the vessel may also be used in the apparatus according to the present invention. Moreover, but this is not preferred, it is possible to provide different devices sensitive to the level of liquid in the same apparatus.

By use of the apparatus of the present invention a very accurate volume of liquid may be filled into the vessel and delivered therefrom. Because the volume of liquid filled into the vessel and the volume of liquid delivered therefrom is the volume between the second liquid level sensitive device and a valve or other closure means at the bottom of the vessel or in the case of the preferred embodiment of the invention between the second liquid level sensitive device (upper device) and the third liquid level sensitive device (lower device) an accurately graduated liquid vessel is not required. A high degree of accuracy is obtained in regard to the liquid filled into the vessel or delivered therefrom without much sacrifice in the speed of operation because most of the liquid is delivered into the vessel by the faster filling line or pipe and the final volume only between the first device and the second device is delivered slowly through the slower filling branch. This slower filling is a necessary feature of the device of the present invention because it reduces the liquid surge which occurs whenever a liquid charging line closure means such as a valve is opened or closed. Thus when a valve which has a comparatively high liquid throughput is closed the volume of liquid delivered varies considerably depending on the surge which takes place, however when the liquid throughput is comparatively small a correspondingly smaller surge takes place. The provision of the extension to the liquid vessel is also a necessary feature of the present invention because the volume of liquid per unit height is only about one-hundreth of the volume of liquid per unit height in the main body of the vessel if the cross section of the extension is one-tenth the cross section of the body of the vessel. In the apparatus of the present invention the level of liquid rises quickly in the main body of the vessel and then slowly up the extension before the liquid inlet is closed and then if a liquid surge occurs this causes very little variation in the level and such variation affecting the volume of liquid in the vessel as a whole only to a small extent.

In a further embodiment of the apparatus of the present invention there is provided a fourth device sensitive to the level of the liquid in the container. This device is situated below the third or lower device which controls the liquid outlet valve. The fourth device controls a slow running outlet valve which is mounted in parallel with the normal outlet valve.

In operation when the level of the liquid falls below the third device the normal outlet valve is shut and the slow running outlet valve opens. When the level of the liquid falls below the fourth device this valve shuts. The case of this apparatus the volume of liquid delivered is the volume between the upper probe (first device) and the fourth device.

In a modification of this embodiment of the invention the fourth device is present in an area of constricted diameter of the container. The liquid outlet valve may be connected to the container directly to the end of the constricted diameter or, preferably, the diameter of the vessel may increase again. It is to be understood that the diameter of the vessel in the area of the fourth device must not be very narrow because this would restrict the outlet flow from the container.

In this embodiment of the apparatus of the present invention the affect of any liquid surge when the outlet valve is closed is minimized.

However, it is to be understood that the liquid surge produced when the outlet valve is closed is not great and more important it is always the same because the liquid head, i.e. the amount of liquid in the vessel is always the same for every position of the liquid level indicating devices. On the other hand, the liquid surge when the vessel is being filled varies depending on the head of the filling liquid.

The accompanying figures will serve to illustrate a preferred embodiment of an apparatus according to the present invention.

FIG. 1 is a cross-sectional side elevation of a liquid metering device.

In FIG. 1 a cylindrical liquid container 1 has an integral extension 2 which has one-tenth of the diameter of the container 1. Suspended in the container vessel there are a lower electrical contact probe 3 and a middle electrical contact probe 4 which is situated just below the entrance to the extension 2. Towards the top of the extension 2 is suspended an upper electrical contact probe 5. At the bottom of the vessel 1 is an outlet pipe 6 which has an in-line valve 7. A liquid supply manifold 10 is connected to the vessel 1 by two branch pipes 11 and 12 which join to form the liquid inlet pipe 13. Connected into pipe 11 is a liquid inlet valve 14 and connected into pipe 12 is a liquid inlet valve 15. Above the valve 15 is a restriction 16.

Before the apparatus is used tests are carried out to determine the relative positions or probes 5 and 3, the levels of which are moveable to a limited extent, in order to dispense a predetermined quantity of liquid.

The apparatus is then ready to be used to dispense the predetermined quantity of liquid. To do so valve 14 is caused to open and liquid from manifold 10 enters the vessel 1 via the inlet pipe 13. The liquid level in vessel 1 continues to build up comparatively rapidly until the end of probe 4 is just reached. A circuit is then completed which causes valve 14 to shut and valve 15 to open. Liquid continues to run into the vessel 1 and then into extension 2 comparatively slowly until the end of probe 5 is just reached. A circuit is thus made which causes valve 15 to close. At a preset time interval after valve 15 is closed valve 7 is automatically caused to open and the liquid in vessel 1 falls until probe 3 is just uncovered. This breaks a circuit and causes valve 7 to shut, the device having dispensed the predetermined quantity of liquid. It is possible to arrange for valve 14 to be operated automatically if it is required to dispense an integral number of the predetermined volumes of liquid. Thus as soon as valve 7 shuts a relay then causes valve 14 to open.

A particular use of the metering device just described is as part of a batch metering system. A typical system is illustrated in the accompanying FIG. 2 which is a diagrammatic flow chart of the system.

Figure 2:
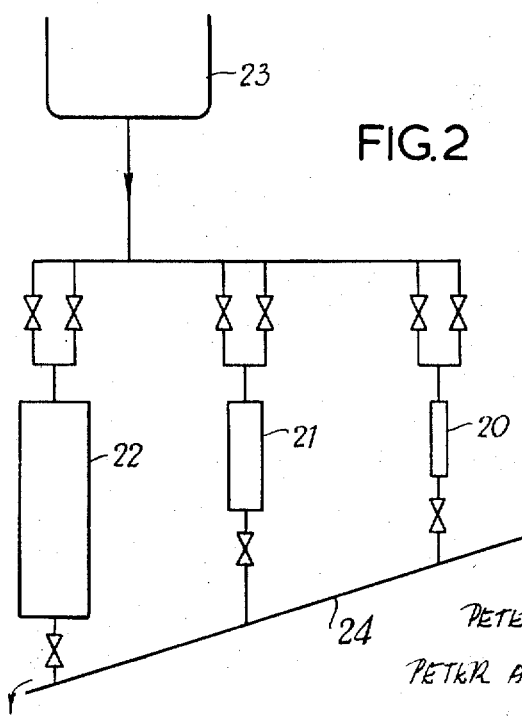

In FIG. 2 the system shown comprises three metering apparatus each of which are similar to the apparatus shown in FIG. 1 but varying in their dimensions. Apparatus 20 is adapted to dispense 0.1 litre of liquid, apparatus 21 is adapted to dispense 1 litre of liquid and apparatus 22 is adapted to dispense 10 litres of liquid. Each of the devices are attached via an inlet pipe to a common liquid supply tank 23 and the outlet pipe from each of the apparatus runs into a common manifold 24 which takes the dispensed liquid to a tank from whence it is used.

Using a system of this type it is possible to rapidly and accurately dispense any required volume of the liquid in tank 23 from 0.1 litre upwards. In practice the upper limit would be 100 litres. If it were necessary, in general, to dispense more than 100 litres a fourth apparatus having a capacity to dispense 100 litres would be provided.

A solid-state control or any conventional control system may be provided which enables the system to work automatically, the number of times each vessel being required to empty being programmed onto the control system. For example if it were required to dispense 23.5 litres from the system of FIG. 2 the portion of the control which relates to apparatus 20 would be programmed to empty 5 times, the portion of the control which relates to apparatus 21 would be programmed to empty three times and the portion of the control which relates to apparatus 22 would be programmed to empty twice. When the system is started each apparatus would fill and empty the requisite number of times, each device working, quite independently of the others.

Figure 3:
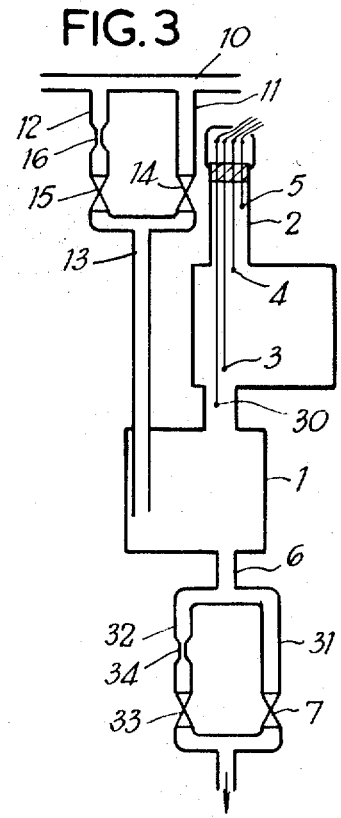

FIG. 3 shows a modified from of the device of FIG. 1. The numbers in FIG. 3 indicate the same features as those of FIG. 1 but in addition there is present a fourth probe 30. This probe 30 is present in the part of the container 1 which has a reduced diameter. Attached to the outlet pipe 6 is an outlet manifold having two branches 31 and 32. In branch 31 is a valve 7. In branch 32 is a valve 33 and above this valve is a restriction 34.

The liquid metering device of FIG. 3 works in a similar manner to that of FIG. 1. Before the apparatus is used tests are carried out to determine the relative positions or probes 5 and 30, the levels of which are moveable to a limited extent; in order to dispense a predetermined quantity of liquid.

The apparatus is then ready to be used to dispense the predetermined quantity of liquid. To do so valve 14 is caused to open and liquid from manifold 10 enters the container 1 via the inlet pipe 13. The liquid level in vessel 1 continues to build up comparatively rapidly until the end of probe 4 is just reached. A circuit is then completed which causes valve 14 to shut and valve 15 to open. Liquid continues to run into the vessel and then into extension 2 comparatively slowly until the end of probe 5 is just reached. A circuit is thus made which causes valve 15 to close. At a preset time interval after valve 15 is closed valve 7 is caused to open automatically and the liquid in vessel 1 falls until probe 3 is just uncovered. This breaks a circuit and causes value 7 to shut and valve 33 to open. The liquid outflow rate from the vessel 1 is then much slower due to the restriction 34. When the level of the liquid in vessel 1 drops so that probe 30 is just uncovered, the circuit is broken and valve 33 is caused to shut. The device has now dispensed the predetermined quantity of liquid. Due to the extra probe 30, the restricted diameter of the vessel 1 in the area of probe 30 and to the restricted outflow during the final stages of dispensing the liquid, very little liquid surge is caused when the outlet valve is shut. By use of this modified embodiment of the device it is possible to dispense consistently accurate volumes of liquid.

We claim as our invention:

1. An apparatus for metering liquid into a vessel to establish a predetermined level of liquid in the vessel, which comprises a main vessel having an extension at the upper end thereof which is of substantially smaller cross section than the main body of the vessel and within which extension the said predetermined level is set, a first device sensitive to the level of liquid in the main body of the vessel and adapted to operate when the said level reaches a position near to the top of the main body of the vessel, a second device sensitive to the level of liquid in the said extension and adapted to operate when the level in said extension reaches the said predetermined level, means for charging liquid to the vessel including a feed line operating at a faster rate and a feed line operating at a slower rate, and means for stopping the flow of liquid through the faster line by operation of the said first device, and means for stopping the flow of liquid through the slower line by the operation of said second device.

2. Apparatus according to claim 1 wherein liquid is discharged from the vessel via a discharge pipe located at the base of the container, there being means for stopping the discharge of liquid from the discharge pipe.

3. Apparatus according to claim 2 wherein the discharge of liquid from the vessel is stopped by operation of a third device sensitive to the level of liquid in the main body of the vessel and adapted to operate when the said level falls to a level below the level of liquid at which the first said device operates.

4. Apparatus according to claim 2 wherein the means in each case for stopping the flow of liquid through the said faster filling line, for stopping the flow of liquid through the said slower filling line and for stopping the discharge of liquid from the vessel is an in-line valve.

5. Apparatus according to claim 2 wherein the discharge of liquid from the vessel is controlled by operation of a third device sensitive to the level of liquid in the main body of the vessel and adapted to operate when the said level falls to a level below the level of liquid at which the first said device operates and wherein the discharge of liquid from the vessel is stopped by operation of a fourth device sensitive to the level of liquid in the main body of the vessel and adapted to operate when the said level falls to a level below the level of liquid at which the third said device operates.

6. Apparatus according to claim 1 wherein the means for charging liquid to the vessel is a liquid supply manifold connected to a liquid storage vessel, the said manifold having two branches therefrom which constitute the two feed lines, one being the said faster feed line and the other being the said slower feed line.

7. Apparatus according to claim 1 wherein the liquid to be metered is an electroconductive liquid and the device sensitive to the level of liquid in the vessel comprise electrical contact probes.

8. A metering device for electroconductive liquids which comprises a liquid container vessel which has at its top end an extension integral with the container but having a substantially smaller cross section than the main body of the vessel, there being present in the body of the vessel a lower electrical contact probe and a middle electrical contact probe and these being present in the extension to the liquid vessel an upper electrical contact probe, further there being present in the vessel a liquid inlet pipe, the said liquid inlet pipe being connected by two branches to a liquid supply manifold, one branch being a faster filling branch having an in-line valve, the closing of which is controlled by the said middle probe, the other branch being a slower filling branch having an in-line valve, the closing of which is controlled by the said upper probe, and there being an outlet pipe from the liquid vessel which comprises an in-line valve, the closing of which is controlled by the said lower probe, and there being attached to the device means for controlling the opening of each of the three valves.

9. A metering device for electroconductive liquids which comprises a liquid vessel which has at its top end an extension integral with the vessel but having a substantially smaller cross section than the main body of the vessel, there being present in the body of the vessel a bottom electrical contact probe, a lower electrical contact probe and a middle electrical contact probe and there being present in the extension to the liquid vessel an upper electrical contact probe, further there being present in the vessel a liquid inlet pipe, the said liquid inlet pipe being connected by two branches to a liquid supply manifold, one branch being a faster filling branch having an in-line valve, the closing of which is controlled by the said middle probe, the other branch being a slower filling branch having an in-line valve, the closing of which is controlled by the said upper probe, and an outlet pipe from the liquid vessel which has two branches, one branch being a faster discharging branch having an in-line valve the closing of which is controlled by the said lower probe, the other branch being a slower discharging branch having an in-line valve the closing of which is controlled by the said bottom probe, and there being attached to the device means for controlling the opening of each of the four valves.